(12) United States Patent
Koski (10) Patent No.: US 6,768,281 B2
(45) Date of Patent: Jul. 27, 2004

(54) VERIFICATION OF OPERATIONAL CAPABILITY OF A TAPE DRIVE

(75) Inventor: John Alexander Koski, Livermore, CA (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 10/234,204

(22) Filed: Sep. 5, 2002

(65) Prior Publication Data

US 2004/0046515 A1 Mar. 11, 2004

(51) Int. Cl.[7] .................. G01R 31/02; G01R 31/14; H02K 11/00
(52) U.S. Cl. ............... 318/490; 318/6; 318/650; 318/37; 388/909; 324/772; 324/511; 322/99
(58) Field of Search .................. 318/490, 6, 7, 318/599, 636, 639, 650, 651, 37, 115; 388/909, 907.5; 324/772, 511, 522, 523, 513; 322/99; 340/514, 515, 648, 653, 661; 346/33 MC; 235/376, 437, 438, 476

(56) References Cited

U.S. PATENT DOCUMENTS

| | | | | |
|---|---|---|---|---|
| 3,942,111 A | * | 3/1976 | Pfouts ..................... | 324/772 |
| 3,947,764 A | * | 3/1976 | Abbott et al. ............ | 324/772 |
| 4,015,799 A | * | 4/1977 | Koski et al. ............. | 318/7 |
| 4,030,012 A | | 6/1977 | Buhler .................... | 318/565 |
| 4,658,213 A | * | 4/1987 | Finley .................... | 324/772 |
| 4,744,041 A | * | 5/1988 | Strunk et al. ............ | 318/490 |
| 5,731,672 A | * | 3/1998 | Miyaguchi ............... | 318/6 |
| 6,305,629 B1 | | 10/2001 | Chliwnyj et al. ......... | 242/334.3 |
| 2002/0149872 A1 | * | 10/2002 | Koski ..................... | 360/71 |

FOREIGN PATENT DOCUMENTS

JP    2002312991 A  * 10/2002    ........... G11B/15/43

OTHER PUBLICATIONS

"Measurement of Tape Drive Reel Motor Torque", IBM Technical Disclosure Bulletin, Mar. 1994, pp537–540.
"Microprocessor–Controlled Recorder", IBM Technical Disclosure Bulletin, Mar. 1979, pp3949–3950.
"Machine Position Control Program Interruption Apparatus", IBM Technical Disclosure Bulletin, Nov. 1976, pp1993–1994.
"Motion Control Diagnostics", IBM Technical Disclosure Bulletin, Jan. 1972, pp2328–2329.

* cited by examiner

Primary Examiner—Robert Nappi
Assistant Examiner—Edgardo San Martin
(74) Attorney, Agent, or Firm—John H. Holcombe (57) ABSTRACT

Verification system logic operates PWM motor drivers for DC motors of a tape drive, and verifies the on time duty cycle period and offset of the PWM motor drivers; verifies DAC current reference and amplifier sense signals against thresholds; and verifies Hall sensor state sequence of the DC motors during rotation. If the verifications are successful, the logic rotates the DC motors, and, for each motor, verifies the time of acceleration at a desired torque; verifies a computed velocity based on a measured velocity to a reference velocity; and verifies an actual rotation rate to a computed velocity.

24 Claims, 4 Drawing Sheets

FIG. 1

```
MOTOR TEST:  SUMMARY
   result: 0 = NO TEST, 1 = PASS, 2 = FAIL
    data:    parameter measurements
             PWM    |  PWM   |   PWM    |  PWM   | MDerr | MDerr |  DAC
            period  | ontime | enab per | offset |  pos  |  neg  | test
inb-motor----------------------------------------------------------------
result           1 |     1  |       1  |     1  |    1  |    1  |    1
data         10424 |  5522  |   10431  |    23  |   95 |-   66  |    0
out-motor----------------------------------------------------------------
result           1 |     1  |       1  |     1  |    1  |    1  |    1
data         10361 |  5539  |   10368  |    30  |   95 |-   66  |    0

Rotate  | Hall st | Rotate  | Hall st | Accel | Veloc | Veloc
            forward | forward | bckward | bckward |       |       | calib
inb-motor----------------------------------------------------------------
result           1 |     1  |       1  |     1  |    1  |    1  |    1
data           137 |    25 |-    146 |-    25  |  831  | 1001  | 4338
out-motor----------------------------------------------------------------
result           1 |     1  |       1  |     1  |    1  |    1  |    1
data           132 |    25 |-    142 |-    25  |  491  | 1012  | 4529
```

VERIFICATION OF OPERATIONAL CAPABILITY OF A TAPE DRIVE

FIELD OF THE INVENTION

This invention relates to tape drives, and, more particularly, to tape drives which employ DC motors, wherein the tape drive is for mounting tape reels for rotation by the DC motors.

BACKGROUND OF THE INVENTION

Tape, such as magnetic tape, provides a means for physically storing data which may be archived or which may be stored in storage shelves of automated data storage libraries, and accessed when required. As an archival medium, tape often comprises the only copy of the data.

The tape is typically thin so as to maximize the length of a tape stored on a tape reel or reels, and thereby maximize the amount of data that can be stored on the tape. If the tape drive does not function properly, the thin tape may be stretched or damaged, possibly causing loss of the data.

Tape drives frequently employ DC motors and feedback control systems with motor drivers for operating the DC motors, to produce well controlled motion parameters such as position, velocity, and tape tension. Such control systems are usually very complex, and the feedback control system may compensate for marginal components, hiding latent problems until a catastrophic failure occurs. At that point, if a user's tape is in the tape drive and under control of the feedback control system, it is likely too late to protect the user's data.

SUMMARY OF THE INVENTION

In accordance with the present invention, a verification system, logic, and a method are provided for verifying operational capability of a tape drive.

In one embodiment, logic is provided for operating a tape drive. The tape drive has a plurality of DC motors for rotating reels, a plurality of PWM motor drivers with DACs for operating the DC motors; and a plurality of Hall sensors for sensing the states of the DC motors. The logic operates the PWM motor drivers, and detects the Hall sensors. The logic:

operates the PWM motor drivers and verifies the on time duty cycle period and offset of the PWM motor drivers;

operates the PWM motor drivers in DISABLE mode and verifies DAC current reference and amplifier sense signals against positive and negative thresholds; and operates the PWM motor drivers to rotate the DC motors in at least one direction, detecting the Hall sensors during the rotation, and verifies the Hall sensor state sequence of each of the DC motors for that direction; and if the verification of the on time duty cycle period and offset for the PWM motor drivers, the verification of the DAC current reference and amplifier sense signals for the PWM motor drivers, and the Hall sensor state sequence for each of the DC motors, are all successful, the logic operates the PWM motor drivers to rotate the DC motors; and accelerates the DC motors with a desired torque, and verifies the time of acceleration of each of the DC motors to a desired velocity;

verifies a computed velocity of each of the DC motors based on a measured velocity, to a reference velocity; and verifies an actual rotation rate of each of the DC motors to a computed velocity thereof.

In another embodiment, additionally, upon detecting failure of any of the verification operations, the logic provides an error signal and identifies which operation failed.

In still another embodiment, the logic conducts the operations with the tape reels unmounted.

In a further embodiment, wherein the tape drive DC motors are bidirectional, the logic operates the PWM motor drivers to rotate the DC motors in a forward direction and in a backward direction, detecting the Hall sensors during the rotations, and verifies the Hall sensor state sequence of each of the DC motors for the forward direction and for the backward direction. In another embodiment, the DC motors are rotated subsequent to the verification of the on time duty cycle period and offset for the PWM motor drivers, and the verification of the DAC current reference and amplifier sense signals for the PWM motor drivers.

In a still further embodiment, the logic initially operates the PWM motor drivers in DISABLE mode, verifying PWM disable period, and determines the verification of the PWM on time duty cycle, and operates the PWM motor drivers in ENABLE mode, verifying PWM signal period and determines the verification of the offset.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
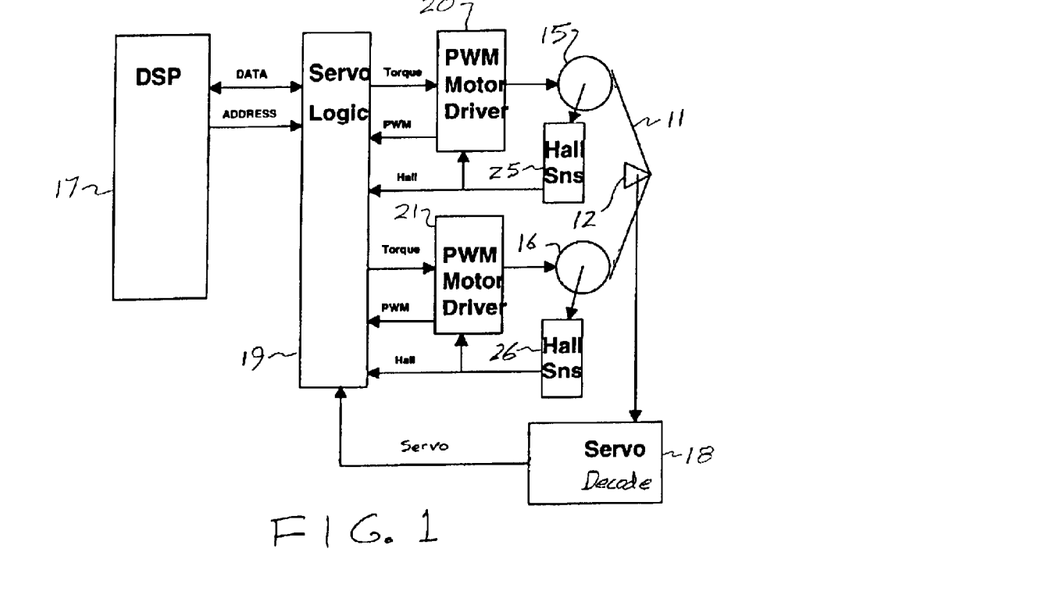
FIG. 1 is a block diagrammatic illustration of a tape drive which implements the present invention.

As discussed above, magnetic tape provides a means for physically storing data which may be archived or which may be stored in storage shelves of automated data storage libraries and accessed when required. FIG. 1 illustrates an example of a tape drive 10 which implements the present invention. A tape drive moves a tape, such as a magnetic tape, along a tape path 11, past at least one read/write head 12 which is positioned at the tape path for reading and/or writing data with respect to the magnetic tape. The magnetic tape may be in the form of a removable magnetic tape cartridge, and the cartridge may comprise a length of tape wound on a single reel, or on dual reels. An example of a single reel tape drive is the IBM 3580 Ultrium magnetic tape drive based on LTO (Linear Tape Open) technology. Another example of a single reel tape drive is the IBM 3590 Magstar magnetic tape drive and associated magnetic tape cartridge.

An example of a dual reel tape drive is the IBM 3570 magnetic tape drive and associated cartridge. In the case of a single reel cartridge, the tape is unwound from the cartridge reel and wound onto a take-up reel of the tape drive. In the case of a dual reel cartridge, both the supply and take-up reels are in the cartridge. The tape reels are mounted for rotation by a plurality of DC motors 15, 16 which rotate the reels to move the tape longitudinally from one tape reel to another tape reel along the tape path 11. A digital signal processor or microprocessor controller 17 comprise the logic with a servo system 18, 19 for operating DC motors 15, 16 by means of a motor control system 20, 21 to rotate the reels at velocities and with accelerations that allow the tape to be moved at desired longitudinal speeds as the tape is unwound from one tape reel and wound onto the other tape reel, while maintaining desired tension on the tape. As discussed above, such servo and control systems may compensate for marginal components, hiding latent problems until a catastrophic failure occurs.

The present invention verifies the proper function of the separate components that make up the control system, before they are used in combination for the purpose of controlling the tape. Thus, components important to the invention do not include the tape, or the read/write head 12. A further motion servo input may comprise a servo track or tracks recorded on the tape and read by the read/write head 12 and decoded by a servo decoder 18. Alternatively, servo tachometers may be provided at each DC motor or reel to determine the reel rotational velocities. Further, a servo tachometer may be provided in the tape path 11 to directly measure the tape velocity. No direct input of the tape velocity is employed in the present invention, which is applied to the tape drive 10 before the tape is mounted in the tape drive.

The tape reels are driven by DC motors 15, 16, for example, comprising brushless DC motors, but the present technique is also applicable to brushed DC motors. The DC motors are driven by PWM motor driver control systems 20, 21 with current-mode or transconductance amplifiers, as is known to those of skill in the art. The amplifiers have current sense circuits which produce a motor current signal that is subtracted from a reference current supplied by a DAC (digital to analog convertor). The difference between the current reference and the current sense produces an error current signal that is amplified and filtered in a compensator circuit that produces a motor control signal. This signal drives a pulse width modulator (PWM) which produces a digital signal that continually reverses the polarity of the voltage that is applied to the DC motor. The PWM signal is fed to a commutator circuit which is also controlled by commutation sensors (Hall sensors) 25, 26 that sense the motor armature position and select the proper motor winding that is to be excited.

The PWM signal is also fed to the servo control logic 19 that measures the on period (duty cycle) and the total period of the PWM signal. This information is used in the servo control system to compute the motor angular velocities, which velocities are employed in the present invention.

In the servo system, the tape longitudinal velocity is computed from the motor angular velocities, and/or is measured from tachometers, and is used as feedback information in the tape servo control system. The servo and control system 19, 20, 21 is a multiple input, multiple output (MIMO) system that computes two control values for the plant, which is made up of the two motors 15, 16, two tape reels, and the tape path connecting the two reels. This is so that the reels are rotated at the appropriate, usually different, rotational velocities, such that the tape is moved from one tape reel having one diameter of tape, to another tape reel having another diameter of tape, at the same longitudinal velocity.

The MIMO control system computes the control values, in this case the required motor currents, to achieve the desired tape motion parameters. The computed motor currents are converted to analog voltages in digital to analog convertors (DACs) which drive the current mode amplifiers.

Figure 2:
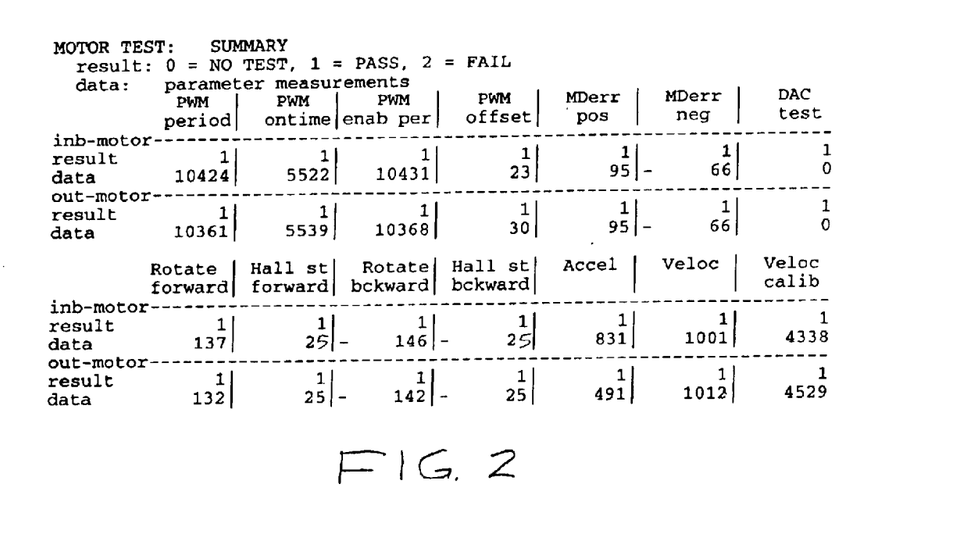
FIG. 2 is a diagrammatic illustration of an example of test results for the tape drive of FIG. 1 in accordance with the present invention.

In the present invention, components of the system are verified for function individually prior to use in the integrated control system. Important parameters of each component are measured and compared to acceptable limits for verification. If the measured parameter is outside acceptable limits, the verification system flags the component as defective, and provides an error signal. The verification system may present the results of the verification process in summary form at the conclusion of a test, along with the parameter measurements, such as is illustrated in FIG. 2. In FIG. 2, all the parameter measurements are provided along with a pass-fail flag for each measurement.

The verification process of the present invention is run on the hardware, for example, after the machine power on step. It may also be invoked during special error analysis steps when machine functions are to be verified. During the manufacturing phase of the tape drive, this verification process will assure that functional components have been assembled into every tape drive produced.

In accordance with an aspect of the present invention, when a failing component is detected, the verification process identifies the failing component, and provides the data for the failure, thus isolating the component that must be replaced to correct failure of the tape drive.

Further, in the customer environment, the verification process of the present invention detects failing components at machine power on, and provides status of the failure that will prevent usage of the machine, preventing jeopardy to customer data.

Figure 3:
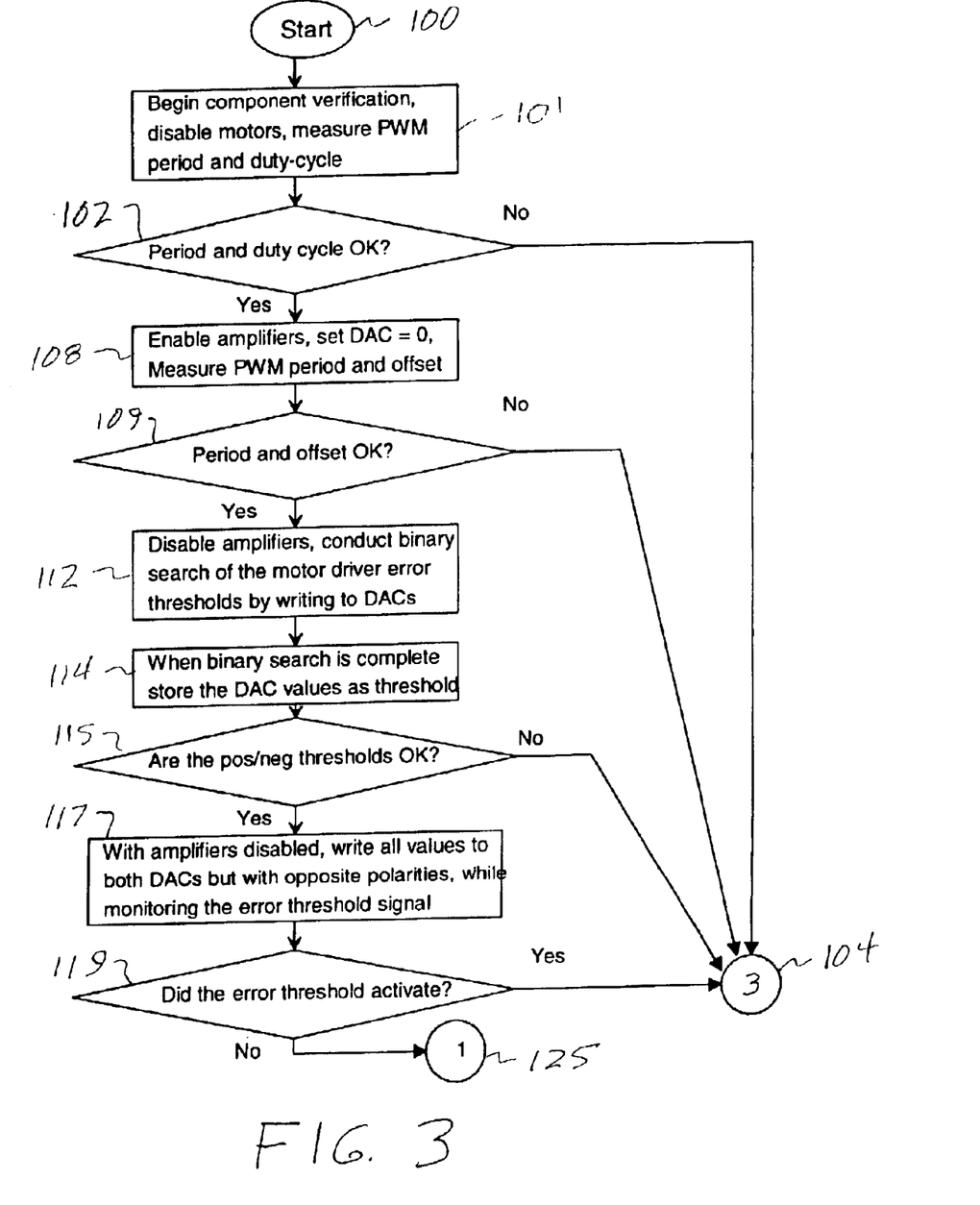
FIGS. 3, 4 and 5 are flow charts depicting an embodiment of the method of the present invention for verifying operational capability of the tape drive of FIG. 1.

Referring additionally to FIG. 3, the verification process checks out the hardware system in a systematic manner, beginning with circuits and hardware that are checked without rotating the DC motors, and, if verified, the motors are then rotated and accelerated. In accordance with one aspect of the present invention, the verification process is conducted with tape reels unmounted, thereby assuring that damage to a tape is avoided.

Beginning at step 100, for example, comprising a power on of the tape drive, the digital signal processor or microprocessor controller 17 logic conducts the component verification process. For example, the process begins in step 101 with an optional initial step of operating the PWM motor drivers in DISABLE mode, such that the DC motors are disabled, and measuring the PWM disable period and on time duty cycle. At power on, the motor driver power amplifiers are biased with a power voltage, such as +12 volts, and are in the disabled mode, as is known to those of skill in the art. In this mode, the PWM signals will be active with approximately a 50% duty cycle. The first tests are to verify the PWM signals are working in this manner, and at the correct frequencies. This step may be omitted and, if faulty, the result would appear immediately in a following test. Thus, in step 101, the PWM disable period for each motor driver amplifier is measured, and, in step 102, the PWM disable period is verified, thereby verifying that the motor driver amplifier is functioning, in that the PWM oscillators are working, and at the correct frequency. Also in step 101, the PWM signal on time is measured, and, step 102 verifies whether the PWM disabled on time duty cycle is proper.

If the PWM disable period or on time duty cycle is outside a desired threshold level, the process proceeds to connector 104, which will indicate component failure, as will be discussed.

Successful verification of the PWM disable period and on time duty cycle are illustrated in the table of FIG. 2.

Then, in step 108 of FIG. 3, the enable signal to the motor driver amplifiers is activated with a value of zero written to the digital to analog convertors (DACs). In this mode, the PWM signal is again measured, and the difference between the on time and 50% of the period is computed to give the PWM offset measurement. If steps 101 and 102 were omitted, the on time measurement is estimated, any failure of the PWM signals will also be identified at this point. Thus, the PWM motor drivers are operated in ENABLE mode in step 108, and step 109 verifies the enable on time duty cycle period and offset of the PWM motor drivers. The PWM offset is the difference between the PWM on time (time when the PWM signal is in the "HI" binary state) and one half of the PWM period (time for one full cycle of PWM). The PWM on time, for zero current command to the DC motors, should be 50% of the period time, so the PWM offset of zero is good, and the PWM offset is verified if it is within a +/− tolerance of zero.

Again, if the enable on time duty cycle period and/or offset of a PWM motor driver is outside a desired threshold level, the process proceeds to connector 104, which will indicate component failure, as will be discussed.

Successful verification of the enable on time duty cycle period and offset of the PWM motor drivers are illustrated in the table of FIG. 2.

In step 112 of FIG. 3, the amplifier enable signal is deactivated, and the motor driver error positive and negative thresholds are measured. With the amplifiers in the disabled state, the amplifiers produce no current in the motors, and the current sense amplifiers will remain with a zero output signal. An amplifier error detection circuit sums these two voltages and monitors the difference between the current reference and the current sense signals, as is known to those of skill in the art. When an error threshold is exceeded, a digital signal is generated which the digital signal processor or microprocessor controller 17 logic of FIG. 1 can monitor. In step 112 of FIG. 3, with the amplifier in disable mode, this circuit detects a difference between these signals which is interpreted as a failure condition for the amplifier, if the amplifier were in enable mode. This failure condition is set when the difference between the reference current and sense current exceed a predetermined threshold. In accordance with the present invention, this threshold is measured by monitoring the error signal which is provided to the digital signal processor or microprocessor controller logic, while various values are written to the DACs. When the DAC value is large enough, the errors are set, and this DAC value represents the error threshold for the motor driver amplifier. In one example, the DACs are written in a binary converging technique to find the error threshold beginning with the most significant bit of the DAC and working to the least significant bit. In step 114, the error thresholds are stored by the logic, and step 115 verifies whether the thresholds are OK. If the thresholds are not OK, the process proceeds to connector 104, which will indicate component failure, as will be discussed.

Successful verification of the thresholds are illustrated in the table of FIG. 2.

As is known to those of skill in the art, the two DAC voltages of the two reel motor driver systems are summed together and compared to a predetermined analog threshold. When the threshold is exceeded, a digital signal is generated which the logic can monitor. In one example, the DACs provide an analog current reference signal to the motor power amplifiers. The amplifiers apply voltage to the motor windings to control the motor current to the reference from the DACs. The amplifiers have "current sense" circuits to do this, the current sense circuits provide an analog signal representing the actual current flowing in the DC motors. The difference between the DAC reference and the current sense signals is monitored in an "amplifier error checking" circuit, and, if these two signals don't agree within the "threshold" tolerance, the error checking circuit generates a binary signal to the logic indicating this condition. In step 117 of FIG. 3, the two DACs are written with the same magnitude values, but with opposite signs, thus one DAC will be positive polarity and the other DAC will be negative polarity. In this case, the sum of the two DAC values will be zero, and the analog threshold should not be exceeded, regardless of the magnitude values written to the DACs. If the analog threshold is exceeded, this is an indication that one of the DACs has failed. In this verification step, all DAC values from the largest negative value to the largest positive value may be written to the DACs, and the error condition is monitored.

Step 119 verifies whether the error threshold was activated. If the error threshold was activated, the process proceeds to connector 104, which will indicate component failure, as will be discussed.

Successful verification of the error threshold is illustrated in the table of FIG. 2.

Thus, steps 112, 114, 115, 117, 119 of FIG. 3 illustrate an embodiment of the present invention for operating the PWM motor drivers in DISABLE mode and verifying DAC current reference and amplifier sense signals against positive and negative thresholds.

Figure 4:
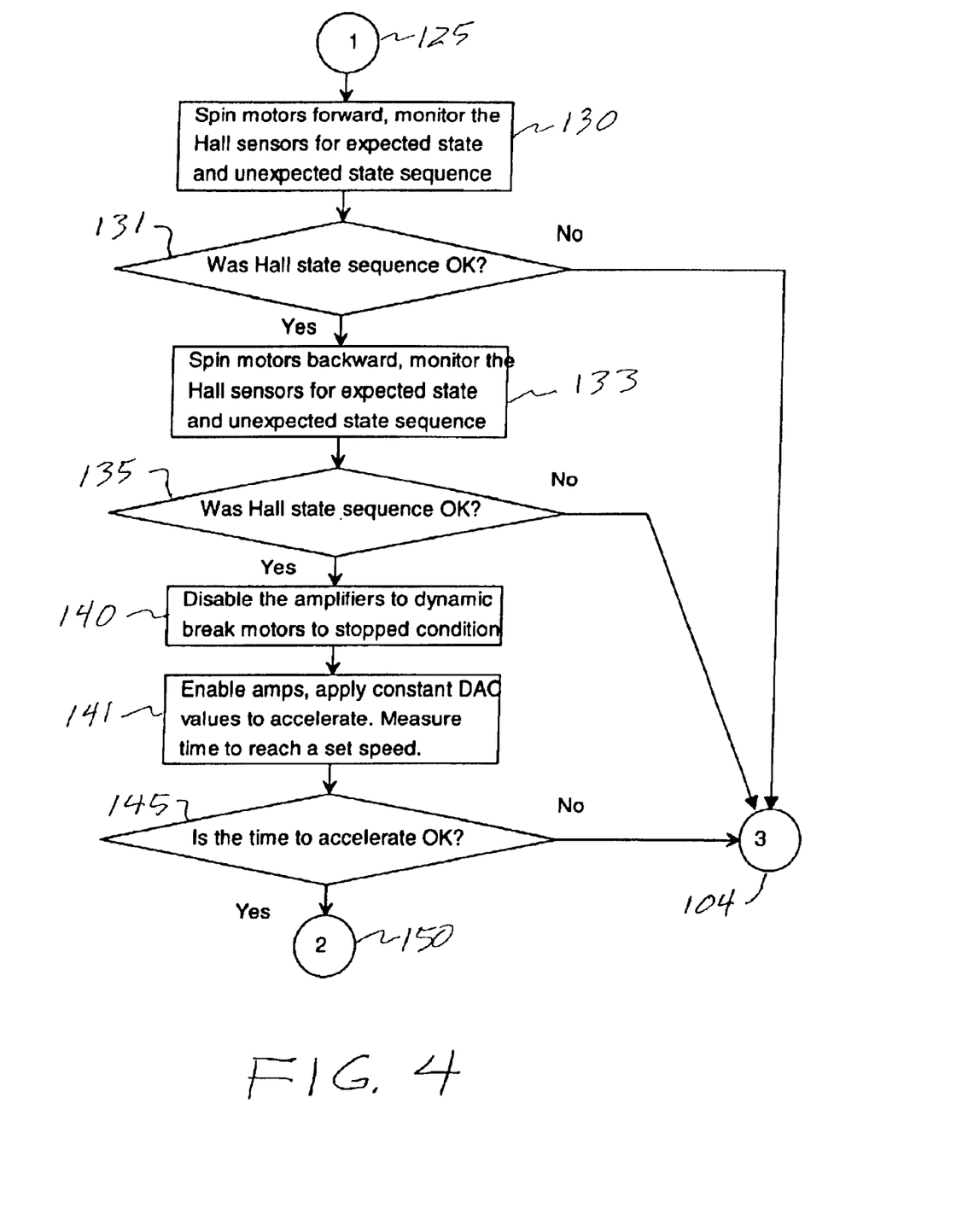

Step 119 then leads to connector 125 and to step 130 of FIG. 4. Preferably, but not necessarily, steps 101 to 119 of FIG. 3 are completed prior to step 130 so that the operation of the PWM motor drivers 20 and 21 of FIG. 1 are verified without any motion of the of the components of the servo control system. This constitutes the static component test of the control system. Thus, if all the previous tests have passed, the verification process proceeds to a test of the components involving operation of the motor drivers for rotating the DC motors.

In step 130 of FIG. 4, the DC motors are rotated in at least one direction. The DC motors are typically bidirectional to move the tape in either direction. Optionally, the DC motors may be first rotated in one direction, and then rotated in the opposite direction. The illustrated example of FIG. 4 rotates the DC motors first in the forward direction, and then rotates the DC motors in the backward direction.

In step 130 of FIG. 4, the first test is a forward motion test of the DC motors, monitoring the Hall sensors 25, 26 of FIG. 1. An optional extra test may comprise rotating the motors at a fixed velocity and counting the Hall count change during a predetermined time period. The time measurement may be made using counters of the servo logic, and the result is compared to pass-fail thresholds for high and low values. An example of a rotate forward count is illustrated in the table of FIG. 2.

Figure 6:
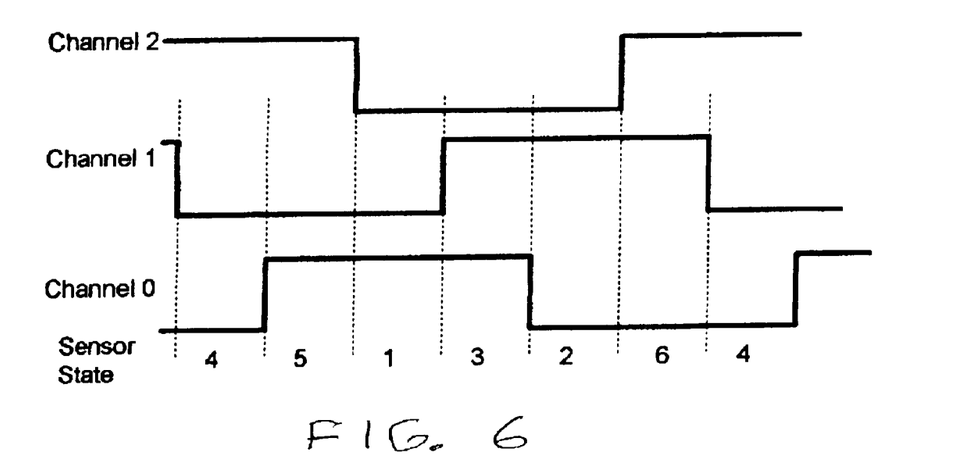
FIG. 6 is a diagrammatic illustration of Hall sensor signals for motion of a DC motor.

In step 130 of FIG. 4, while the DC motors are rotating in the forward direction, and after the optional forward rotation test has completed, the Hall sensor forward motion state verification is conducted. In this test, there is a test for invalid Hall transitions and a concurrent test for valid Hall sequence for forward rotation. As is known to those of skill in the art, as a DC motor is rotating, the Hall states proceed through a specific sequence. For example, referring to FIG. 6, the sequence of states for a three channel Hall sensor are indicated while the motor is rotated in one direction, for example, the forward direction. The sequence of states for this direction of motion is 4, 5, 1, 3, 2, 6.

During step 130 of verification of FIG. 4, the sequence of expected Hall states is monitored, and, during which time, the occurrence of an unexpected Hall state will force an error detection. For example, referring to FIG. 6, in state 4, the logic looks for state 6 to occur, which happens after 5 Hall states pass (5, 1, 3, 2, 6), and, in state 6, the next state the logic looks for is 2. That requires another 5 Hall transitions to occur (4, 5, 1, 3, 2). This continues until the logic finally searches for state 5. In all, 25 Hall states should pass for this test to complete, so that the pass-fail Hall count will be 25 to pass, any other number will fail. In the example, the test causes the motor to rotate through at least one full rotation, since there are 24 Hall states per full motor turn, thereby checking all the magnetic poles in the motor with the Hall sensors. Another set of logic checks to make sure that the Hall sequence is always 4, 5, 1, 3, 2, 6, for the whole test duration, and if the Hall sequence is different than that, the test fails.

If, in step 131, both the tests for invalid Hall transitions and the concurrent test for valid Hall sequence for forward rotation are met, this verification of the Hall sensor state sequence of each of said DC motors for at least one direction passes. If either of the tests fails, the process proceeds to connector 104, which will indicate component failure, as will be discussed.

Successful verification of the Hall sensor state sequence for motion in the forward direction is illustrated in the table of FIG. 2.

The optional backward motion motor rotation test 133 of FIG. 4, may additionally comprise the optional extra test of rotating the motors at a fixed velocity and counting the Hall count change during a predetermined time period, comparing the result to pass-fail thresholds for high and low values, as discussed above for the forward direction. An example of a rotate backward count is illustrated in the table of FIG. 2.

The backward motion state verification test is then conducted in step 133 of FIG. 4. As discussed above, there is a test for invalid Hall transitions and a concurrent test for valid Hall sequence states for backward rotation. During this step of verification, the sequence of expected Hall states is monitored, during which time, the occurrence of an unexpected Hall state will force an error detection. If, in step 135, both of these conditions are met, this test passes. Once again, when this test begins, the expected sequence of Hall transitions is monitored, but for the opposite direction of rotation. Since the next sequential backward state will not occur until five Hall states have occurred, the total number of states in the test sequence is (6−1)×5=25. This number is monitored at the end of the test as a pass-fail determination of the proper occurrence of Hall states for five cycles of the Hall sensors of the motors.

If, in step 135, both the tests for invalid Hall transitions and the concurrent test for valid Hall sequence for backward rotation are met, this verification of the Hall sensor state sequence of each of said DC motors for the backward direction passes. If either of the tests fails, the process proceeds to connector 104, which will indicate component failure, as will be discussed.

Successful verification of the Hall sensor state sequence for motion in the backward direction is illustrated in the table of FIG. 2.

In accordance with the present invention, if the previous tests have completed successfully, there is sufficient function for motion of the DC motors to be controlled and monitored.

Thus, in steps 140 and 141 of FIG. 4, tests of motor control parameters are begun. As one example, the next test performed is the motor acceleration test. The acceleration test is preferably, but not necessarily, begun from a stopped condition. Thus, step 140 comprises bringing the motors to a stop condition by disabling the amplifiers and dynamic braking of the motors.

During the test of step 141, the motors are driven with a predetermined fixed torque value. The torque may be the same, or different, for each of the DC motors. The constant torque value is developed by writing a fixed value to the DACs with the motors enabled. With the fixed value of torque applied, the DC motors will accelerate at a rate determined by the torque value, and the inertia's of the motors and their loads, and by friction. The time duration of acceleration and the motor velocity are monitored to determine the elapsed time to reach a desired velocity. The elapsed time for this acceleration is measured and, in step 145, compared to pass-fail criteria.

If the step 145 verification of time of acceleration of each of the DC motors to a desired velocity fails, the process proceeds to connector 104, which will indicate component failure, as will be discussed.

Successful verification of the time of acceleration of each of the DC motors is illustrated in the table of FIG. 2.

Figure 5:
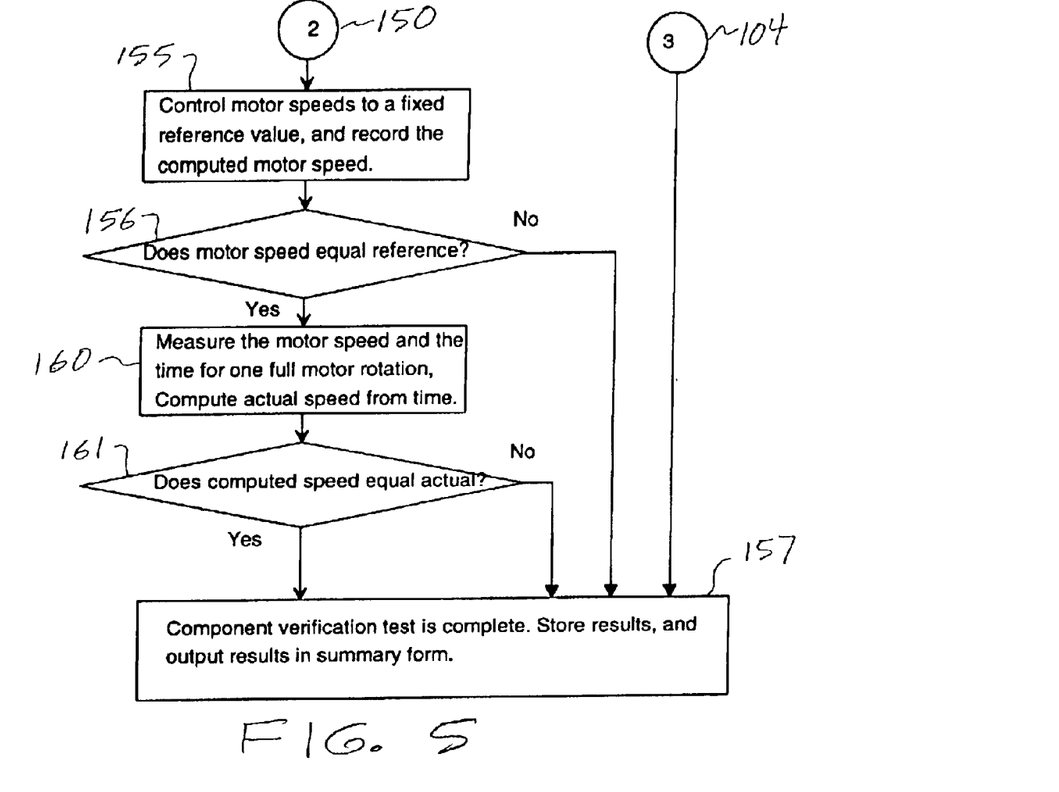

Step 145 then leads to connector 150 and to step 155 of FIG. 5, which is a DC motor velocity test. This test determines if the measured and computed motor velocity conforms to a reference velocity when the measured velocity is used in the feedback control system for each motor. The velocities may be the same, or different, for each of the DC motors. In the test, the reference velocity is maintained for a long enough duration to allow the motor velocities to stabilize at a steady state. After this time duration, the value of the measured velocity is determined and compared, in step 156, to the reference velocity. The pass-fail criteria for this test is determined by comparing the measured motor velocity to the reference velocity within an allowed threshold.

If the step 156 verification of computed velocity of each of the DC motors based on a measured velocity, to a reference velocity fails, the process proceeds to step 157, which will indicate component failure, as will be discussed.

Successful verification of the computed velocity of each of the DC motors based on a measured velocity, to a reference velocity is illustrated in the table of FIG. 2.

The process proceeds at step 160 of FIG. 5 which verifies whether the actual motor velocity and the computed motor velocity agree to within a required tolerance. As is known to those of skill in the art, the computed motor velocity is used to compute secondary velocity of the tape for feedback in the tape transport. The test of step 160 provides verification that the computed value of motor velocity based on the PWM signals represents the actual value of motor velocity. Alternatively, other examples of computed motor velocity may comprise velocities calculated from tachometers that may be provided at each DC motor or reel to determine the reel rotational velocities. However, no servo tachometer provided in the tape path is measured, in that the verification is conducted before the tape is mounted in the tape drive. The velocities may be the same, or different, for each of the DC motors, and may be the same, or different, than velocities of other verification steps.

In step 160, the actual motor velocity is calculated from the full rotation time of the motor, measured by monitoring the time duration of 24 Hall states. The test is done with the DC motor velocity of each of the DC motors controlled to a stable velocity, and step 161 verifies whether the actual rotation rate of each of the DC motors is equal to a computed velocity thereof, within a predetermined tolerance.

If the step 161 verification of the actual rotation rate of each of the DC motors to a computed velocity thereof fails, the process proceeds to step 157, which will indicate component failure, as will be discussed.

Connectors 104 of FIGS. 3, 4, and 5 also lead to step 157 of FIG. 5.

Successful verification of the actual rotation rate of each of the DC motors to a computed velocity is illustrated in the table of FIG. 2.

As the last illustrated verification step, step 161 of FIG. 5, if successful, also proceeds to step 157.

Connectors 104 of FIGS. 3, 4, and 5 also lead to step 157 of FIG. 5.

In step 157, the verification system logic, upon detecting failure of any of the operations, provides an error signal and identifies the operation that failed.

The table of FIG. 2 may be provided in step 157 of FIG. 5, and presents the results of all the motor and motor driver system components whose operation has been verified. In the example of FIG. 2, the data and pass-fail flags are shown for both DC motors, called "inboard" and "outboard" motors, and for the driver circuits of the tape drive. If the value returned for the result for all tests is "1", then all components of the test have passed. Any test with a result of "2" indicates that component failed it's test. A result value of "0" indicates the test for that component could not be completed, due to failure of an earlier component test. In the example, all tests are shown as successful.

The precise sequencing of the verification tests may be altered, as is known to those of skill in the art, although the tests comprising steps 100–135 of FIGS. 3 and 4 must be successfully completed, such that if verification of the on time duty cycle period and offset for the PWM motor drivers, the verification of the DAC current reference and amplifier sense signals for the PWM motor drivers, and the Hall sensor state sequence for each of the DC motors, are all successful, then the PWM motor drivers may be operated to rotate the DC motors for the acceleration and velocity verification tests.

While the preferred embodiments of the present invention have been illustrated in detail, it should be apparent that modifications and adaptations to those embodiments may occur to one skilled in the art without departing from the scope of the present invention as set forth in the following claims.

I claim:

1. A verification system for a tape drive, said tape drive having a plurality of DC motors, said verification system comprising:

a plurality of PWM motor drivers with DACs for operating said DC motors;

a plurality of Hall sensors for sensing the states of said DC motors; and logic for operating said PWM motor drivers, and detecting said Hall sensors, said logic:

operating said PWM motor drivers and verifying the on time duty cycle period and offset of said PWM motor drivers;

operating said PWM motor drivers in DISABLE mode and verifying DAC current reference and amplifier sense signals against positive and negative thresholds; and operating said PWM motor drivers to rotate said DC motors in at least one direction, detecting said Hall sensors during said rotation, and verifying the Hall sensor state sequence of each of said DC motors for said at least one direction; and if said verification of said on time duty cycle period and offset for said PWM motor drivers, said verification of said DAC current reference and amplifier sense signals for said PWM motor drivers, and said Hall sensor state sequence for each of said DC motors, are all successful, operating said PWM motor drivers to rotate said DC motors; and accelerating said DC motors at desired torque, verifying time of acceleration of each of said DC motors to a desired velocity;

verifying a computed velocity of each of said DC motors based on a measured velocity, to a reference velocity; and verifying an actual rotation rate of each of said DC motors to a computed velocity thereof.

2. The verification system of claim 1, wherein said logic, upon detecting failure of any of said operations, provides an error signal and identifies the operation that failed.

3. The verification system of claim 2, wherein said tape drive is for mounting tape reels for rotation by said plurality of DC motors, and said operations are conducted with said tape reels unmounted.

4. The verification system of claim 1, wherein said DC motors are bidirectional, and wherein said logic operates said PWM motor drivers to rotate said DC motors in a forward direction and in a backward direction, detecting said Hall sensors during said rotations, and verifying the Hall sensor state sequence of each of said DC motors for said forward direction and for said backward direction.

5. The verification system of claim 4, wherein said logic rotates said DC motors subsequent to said verification of said on time duty cycle period and offset for said PWM motor drivers, and said verification of said DAC current reference and amplifier sense signals for said PWM motor drivers.

6. The verification system of claim 1, wherein said logic additionally initially operates said PWM motor drivers in DISABLE mode, verifying PWM disable period, and determining said verification of said PWM on time duty cycle, and operates said PWM motor drivers in ENABLE mode, verifying PWM signal period and determining said verification of said offset.

7. Logic for operating a tape drive, said tape drive having a plurality of DC motors for rotating reels, a plurality of PWM motor drivers with DACs for operating said DC motors, a plurality of Hall sensors for sensing the states of said DC motors, said logic for operating said PWM motor drivers, and detecting said Hall sensors, said logic:

operating said PWM motor drivers and verifying the on time duty cycle period and offset of said PWM motor drivers;

operating said PWM motor drivers in DISABLE mode and verifying DAC current reference and amplifier sense signals against positive and negative thresholds; and operating said PWM motor drivers to rotate said DC motors in at least one direction, detecting said Hall sensors during said rotation, and verifying the Hall sensor state sequence of each of said DC motors for said at least one direction; and if said verification of said on time duty cycle period and offset for said PWM motor drivers, said verification of said DAC current reference and amplifier sense signals for said PWM motor drivers, and said Hall sensor state sequence for each of said DC motors, are all successful, operating said PWM motor drivers to rotate said DC motors; and accelerating said DC motors with desired torque, verifying time of acceleration of each of said DC motors to a desired velocity;

verifying a computed velocity of each of said DC motors based on a measured velocity, to a reference velocity; and verifying an actual rotation rate of each of said DC motors to a computed velocity thereof.

8. The logic of claim 7, additionally, upon detecting failure of any of said operations, provides an error signal and identifies which operation failed.

9. The logic of claim 8, wherein said tape drive is for mounting tape reels for rotation by said plurality of DC motors, and wherein said logic conducts said operations with said tape reels unmounted.

10. The logic of claim 7, wherein said tape drive DC motors are bidirectional, and wherein said logic operates said PWM motor drivers to rotate said DC motors in a forward direction and in a backward direction, detecting said Hall sensors during said rotations, and verifying the Hall sensor state sequence of each of said DC motors for said forward direction and for said backward direction.

11. The logic of claim 10, wherein said logic rotates said DC motors subsequent to said verification of said on time duty cycle period and offset for said PWM motor drivers, and said verification of said DAC current reference and amplifier sense signals for said PWM motor drivers.

12. The logic of claim 7, initially operating said PWM motor drivers in DISABLE mode, verifying PWM disable period, and determining said verification of said PWM on time duty cycle, and operating said PWM motor drivers in ENABLE mode, verifying PWM signal period and determining said verification of said offset.

13. A magnetic tape drive for reading and/or writing data with respect to magnetic tape, comprising:

at least one read/write head positioned at a tape path for reading and/or writing data with respect to a magnetic tape in said tape path;

a plurality of DC motors, whereby tape reels mounted for rotation by said plurality of DC motors, provide said magnetic tape to be moved longitudinally from one said tape reel to another said tape reel along said tape path;

a plurality of PWM motor drivers with DACs for operating said DC motors;

a plurality of Hall sensors for sensing the states of said DC motors; and logic for operating said PWM motor drivers, and detecting said Hall sensors, said logic:

operating said PWM motor drivers and verifying the on time duty cycle period and offset of said PWM motor drivers;

operating said PWM motor drivers in DISABLE mode and verifying DAC current reference and amplifier sense signals against positive and negative thresholds; and operating said PWM motor drivers to rotate said DC motors in at least one direction, detecting said Hall sensors during said rotation, and verifying the Hall sensor state sequence of each of said DC motors for said at least one direction; and if said verification of said on time duty cycle period and offset for said PWM motor drivers, said verification of said DAC current reference and amplifier sense signals for said PWM motor drivers, and said Hall sensor state sequence for each of said DC motors, are all successful, operating said PWM motor drivers to rotate said DC motors; and accelerating said DC motors with desired torque, verifying time of acceleration of each of said DC motors to a desired velocity;

verifying a computed velocity of each of said DC motors based on a measured velocity, to a reference velocity; and verifying an actual rotation rate of each of said DC motors to a computed velocity thereof.

14. The magnetic tape drive of claim 13, wherein said logic, upon detecting failure of any of said operations, provides an error signal and identifies the operation that failed.

15. The magnetic tape drive of claim 14, wherein said operations are conducted with said tape reels unmounted.

16. The magnetic tape drive of claim 13, wherein said DC motors are bidirectional, and wherein said logic operates said PWM motor drivers to rotate said DC motors in a forward direction and in a backward direction, detecting said Hall sensors during said rotations, and verifying the Hall sensor state sequence of each of said DC motors for said forward direction and for said backward direction.

17. The magnetic tape drive of claim 16, wherein said logic rotates said DC motors subsequent to said verification of said on time duty cycle period and offset for said PWM motor drivers, and said verification of said DAC current reference and amplifier sense signals for said PWM motor drivers.

18. The magnetic tape drive of claim 13, wherein said logic additionally initially operates said PWM motor drivers in DISABLE mode, verifying PWM disable period, and determining said verification of said PWM on time duty cycle, and operates said PWM motor drivers in ENABLE mode, verifying PWM signal period and determining said verification of said offset.

19. A method for verifying operational capability of a tape drive, said tape drive having a plurality of DC motors for rotating reels, a plurality of PWM motor drivers with DACs for operating said DC motors, a plurality of Hall sensors for sensing the states of said DC motors, said logic for operating said PWM motor drivers, and detecting said Hall sensors, said method comprising the steps of:

operating said PWM motor drivers and verifying the on time duty cycle period and offset of said PWM motor drivers;

operating said PWM motor drivers in DISABLE mode and verifying DAC current reference and amplifier sense signals against positive and negative thresholds; and operating said PWM motor drivers to rotate said DC motors in at least one direction, detecting said Hall sensors during said rotation, and verifying the Hall sensor state sequence of each of said DC motors for said at least one direction; and if said verification of said on time duty cycle period and offset for said PWM motor drivers, said verification of said DAC current reference and amplifier sense signals for said PWM motor drivers, and said Hall sensor state sequence for each of said DC motors, are all successful, operating said PWM motor drivers to rotate said DC motors; and accelerating said DC motors with desired torque, verifying time of acceleration of each of said DC motors to a desired velocity;

verifying a computed velocity of each of said DC motors based on a measured velocity, to a reference velocity; and verifying an actual rotation rate of each of said DC motors to a computed velocity thereof.

20. The method of claim 19, additionally comprising the step of: upon detecting failure of any of said operation steps, providing an error signal and identifying which operation failed.

21. The method of claim 20, wherein said tape drive is for mounting tape reels for rotation by said plurality of DC motors, and said method comprises conducting said operation steps with said tape reels unmounted.

22. The method of claim 19, wherein said tape drive DC motors are bidirectional, and wherein said step of operating said PWM motor drivers to rotate said DC motors comprises: operating said PWM motor drivers to rotate said DC motors in a forward direction and in a backward direction, detecting said Hall sensors during said rotations, and verifying the Hall sensor state sequence of each of said DC motors for said forward direction and for said backward direction.

23. The method of claim 22, wherein said step of operating said PWM motor drivers to rotate said DC motors is conducted subsequent to said verification of said on time duty cycle period and offset for said PWM motor drivers, and said verification of said DAC current reference and amplifier sense signals for said PWM motor drivers.

24. The method of claim 19, comprising the initial steps of operating said PWM motor drivers in DISABLE mode, verifying PWM disable period, and determining said verification of said PWM on time duty cycle, and operating said PWM motor drivers in ENABLE mode, verifying PWM signal period and determining said verification of said offset.

* * * * *